July 28, 1970            R. G. SMITH            3,521,856

LINED PLUG VALVE WITH MEANS FOR SEALING AGAINST LEAKAGE

Filed Sept. 25, 1967            4 Sheets-Sheet 1

INVENTOR.
RUSSELL G. SMITH
BY J. Warren Finney Jr.
ATTORNEY.

July 28, 1970  R. G. SMITH  3,521,856
LINED PLUG VALVE WITH MEANS FOR SEALING AGAINST LEAKAGE
Filed Sept. 25, 1967  4 Sheets-Sheet 2
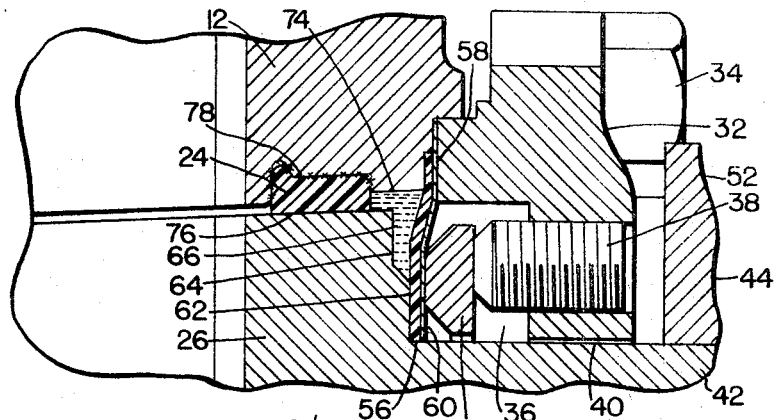
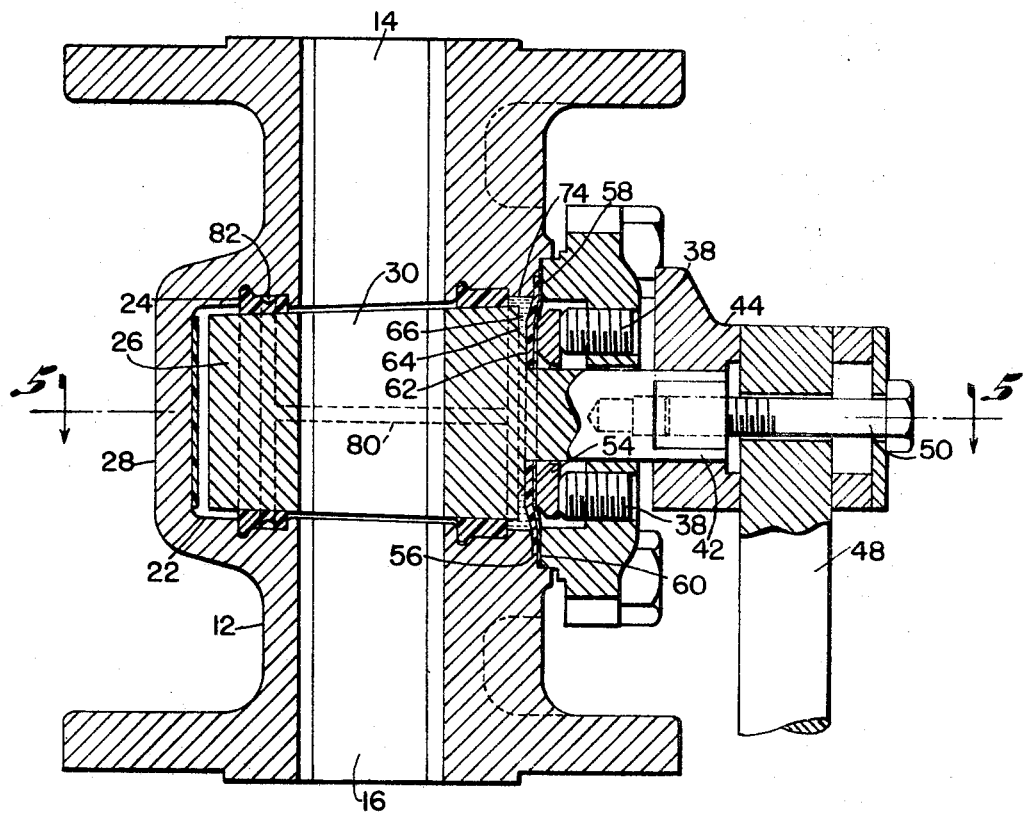
INVENTOR.
RUSSELL G. SMITH
BY
J. Warren Kinney Jr.
ATTORNEY.

INVENTOR.
RUSSELL G. SMITH
BY J. Warren Kinney Jr.
ATTORNEY.

July 28, 1970          R. G. SMITH          3,521,856

LINED PLUG VALVE WITH MEANS FOR SEALING AGAINST LEAKAGE

Filed Sept. 25, 1967          4 Sheets-Sheet 4

INVENTOR.
RUSSELL G. SMITH

BY
J. Warren Kinney Jr.
ATTORNEY.

United States Patent Office 3,521,856
Patented July 28, 1970

3,521,856
LINED PLUG VALVE WITH MEANS FOR SEALING AGAINST LEAKAGE
Russell G. Smith, Cincinnati, Ohio, assignor to Xomox Corporation, Cincinnati, Ohio, a corporation of Ohio
Filed Sept. 25, 1967, Ser. No. 670,041
Int. Cl. F16k 5/16
U.S. Cl. 251—172                                    19 Claims

ABSTRACT OF THE DISCLOSURE

Leakage between the liner and the valve body is prevented by the use of a highly viscous sealant or sealastic which strongly resists flow, and which thereby forms a barrier against leakage of fluid controlled by the valve. The same type of sealant may be utilized in the region of a diaphragm sealing about the actuating stem of the valve plug, to eliminate leakage along the actuating stem to atmosphere. Means may be provided to maintain the sealant under pressure, and/or to replenish the supply of sealant.

---

The present invention relates to a lined plug valve, and a method and means for sealing such a valve against leakage.

Valves used in piping systems for controlling the flow of various chemicals solutions, heated or refrigerated liquids, and corrosive fluids, are known to require frequent servicing or replacements at great expense, not only because of the high cost of such valves, but also because of interruption to normal operation of plants or industries in which the valves are depended upon for continuous production or service. The valve may develop leaks due to temperature changes in the fluid controlled thereby, or in the environment in which the valves are used, and very serious consequences may develop at valves which leak corrosive fluids. In the piping of chlorine, for example, a leak at the valve very likely may destroy the valve and surrounding objects as the chlorine released is exposed to air or moisture to form hydrochloric acid.

Marked improvements have been realized in the art by constructing the valves from specially selected metals or alloys, and by lining the valve bodies with various materials which to some degree minimize the leakage and corrosion problems. One improvement of merit has been to incorporate in the body chamber a plastic liner or sleeve against which the valve plug may seal as the plug is rotated therein to open and closed positions, the liner or sleeve being of a self-lubricating inert polytetrafluoroethylene material such as Teflon. Under certain conditions of use, however, valves so constructed were found to leak particularly as a result of temperature changes affecting the liner.

I have discovered that a Teflon liner, though initially expanded within the body chamber and distended by insertion of the valving plug, may permit leakage of the valve-controlled fluid, not between the plug and the liner, but between the liner and the body chamber in which the liner is assembled. This condition usually resulted from cooling of the valve or the fluid controlled thereby, causing shrinkage of the liner radially toward the plug and thereby inducing the liner to pull away from the body chamber wall. The fluid under pressure controlled by the valve may then escape between the liner and the valve body, even though the plug may have excellent sealing contact with the inner face of the liner. The escaping fluid may in this manner leave the valve along its stem, or it may pass behind the liner from the inlet port to the outlet port of the valve, notwithstanding the fact that the plug may seat perfectly within the liner bore.

Leakage of the character above referred to results from the fact that the coefficient of expansion and contraction of the Teflon liner or sleeve is much greater than that of the material constituting the valve body, which is usually metal. Temperature change within or about the valve accordingly becomes a vital factor in reducing effectiveness of the valve, particularly when the Teflon sleeve is adversely affected by substantial shrinkage causing the sleeve to pull away from its mounting within the valve body chamber.

An object of the present invention is to provide in a lined plug valve, an improved method and means to preclude external and/or internal leakage of valve-controlled fluid resulting from liner shrinkage within the valve body chamber which support the liner.

More specifically, an object of the invention is to provide for the formation of a barrier against fluid leakage about the exterior wall of the liner, when the liner shrinks and pulls away from the wall of the valve body chamber in which the liner is supported.

Another object is to provide a sealant barrier for the purpose stated, which may readily be replaced or reinforced in the event of depletion of the barrier material; the barrier or sealant material being a fluid or elastomer of high viscosity inserted or injected between the exterior portions of the liner and adjacent chamber areas of the valve body.

A further object of the invention is to provide in a plug valve, highly effective and simplified means to preclude leakage of valve-controlled fluid through the sealing gland and along the actuating stem of the valve plug.

The foregoing and other objects are attained by the means described herein and illustrated upon the accompanying drawings, in which:

FIG. 3 is an enlarged fragmentary cross-section detailing a portion of the sealing means of FIG. 1.

FIG. 4 is a view similar to FIG. 1, showing a modification.

Figure 1:
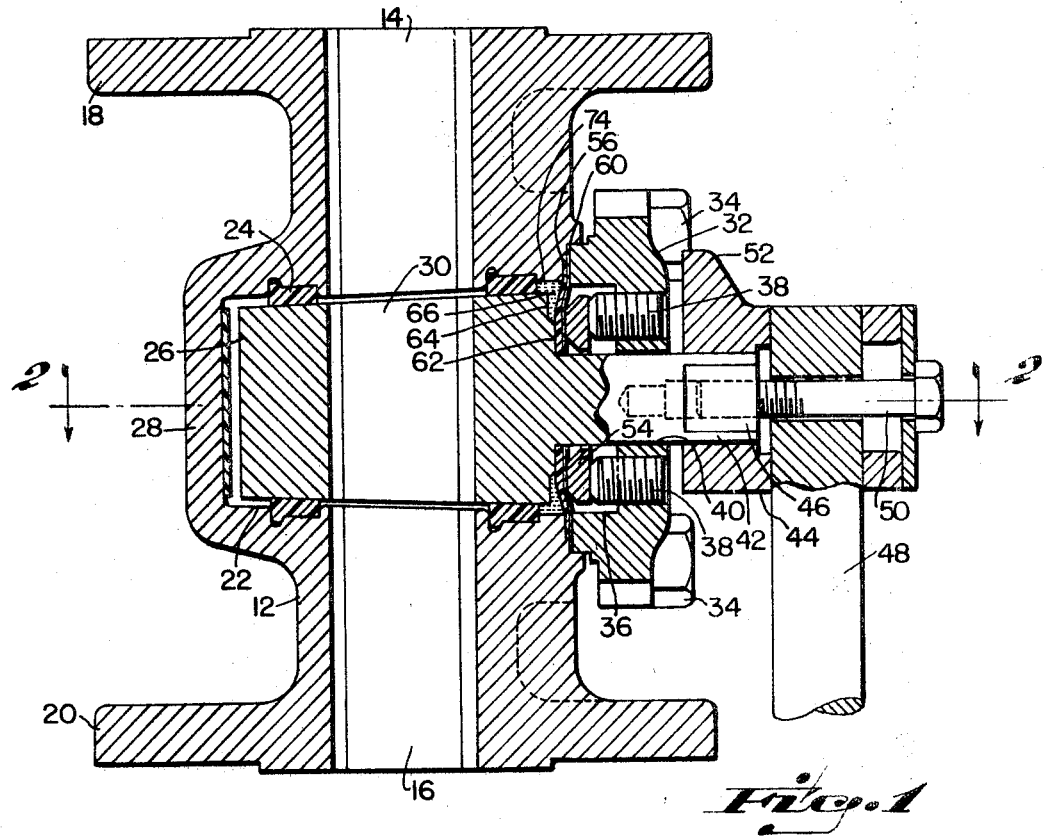
FIG. 1 is a cross-section of the improved valve, taken along the axis of the rotary valving plug.

The valve herein disclosed may comprise a body 12, formed preferably of a suitable metal, having an inlet port 14 and an outlet port 16, each of which may be adapted for connection with pipe sections (not shown) for conveying a fluid under pressure into and from the valve. It is customary to make the pipe connections by means of screw threads, or possibly flanges such as 18 and 20, located at the ports 14 and 16. Body 12 is provided with a chamber in the form of a tapered bore 22 accommodating a correspondingly tapered stationary liner or sleeve 24 within which the tapered valve plug 26 may be rotated. The reduced end of bore 22 may be closed by an end wall 28 of the valve body.

Plug 26 has a through opening or passageway 30 therein, as is usual, to be placed in and out of registry with body ports 14 and 16 incident to partial rotation of the valve plug. Sleeve or liner 24 is of course apertured in registry with the body ports, and is fixed against axial and rotational movement within bore 22 in any suitable manner. The inner surface of the sleeve or liner is tapered complementarily to the taper of plug 26. The material of which the sleeve or liner is formed, may be a plastic material such as Teflon, a polytetrafluoroethylene, or an equivalent impermeable plastic substance presenting to the plug a resilient wear-resistant inherently slippery contact surface capable of making a fluid-tight seal with the tapered smooth outer surface of plug 26.

The larger end portion of tapered bore 22 may be closed by a metallic cover member 32 mounted upon the valve body as by means of several cap screws 34. Cover member 32 has a smooth bore 36 in coaxial relationship with the axis of rotation of plug 26, and at its outer end the cover member may be provided with several openings drilled and tapped to accommodate adjusting screws 38 arranged parallel to and equidistant from the plug axis. A central bore 40 of the cover member loosely accommodates the rotational actuating stem 42 of the valving plug.

Stem 42 extends through the cover member, and a cap 44 keyed thereto at the flat 46 may carry an actuating lever 48 for rotating the valving plug. A screw 50 may be employed to secure lever 48 to the cap in any suitable manner, and the cap may carry an extending stop finger 52 to abut a stationary lug on the body (not shown), to limit rotation of the plug between open and closed valve positions as is customary. The cap and lever arrangement form no part of the present invention, and may therefore be conventional in design.

The valving plug is held seated within stationary liner 24 by the force of adjusting screws 38 bearing against a pressure ring 54, preferably of hard metal, which overlies a liquid-impervious diaphragm that separates the plug chamber 22 from the cover chamber 36. The diaphragm may comprise a centrally apertured disc 56 of Teflon or other suitable impervious flexible material surrounding plug stem 42, and having its outer peripheral margin clamped between cover member 32 and the valve body, as at 58. A diaphragm reinforcing or protective member in the form of a flexible metallic disc 60 may be interposed between the diaphragm and the pressure ring 54, to distribute force applied by the pressure ring and the screws 38. Protective disc 60 is centrally apertured to surround the plug stem, and may completely cover one face of the diaphragm. The protective disc may be marginally clamped, along with diaphragm 56, between the cover member and the valve body as at 58.

From the disclosure of FIG. 1, it will be noted that the larger end portion of plug 26 is provided with an annular planar shoulder or seat 62 against which the inner marginal portion of diaphragm 56 may seat, while under compression by ring 54 and screws 38. Beyond the outer limit of shoulder 62, the end face of the plug may be annularly cut away or relieved as at 64, to provide a relief space between the plug end and the adjacent overlying portion of diaphragm 56. This relief space or pocket is to carry a sealing fluid, indicated by the reference numeral 66, other than the fluid controlled by the valve. Such sealing fluid may be a heavy grease or viscid material which is difficult to move or displace, and will therefore preclude leakage of fluid from the valve past shoulder or seat 62 and along the stem of the valve plug.

The sealing fluid or sealant 66 may be a heavy viscid grease, a silicone grease, or a caulk-like ocmpound which is characterized by high viscosity and great resistance to dilution by the fluid being passed through the valve. The viscosity of the sealing fluid, or its resistance to displacement, should be greater than that of the fluid being controlled by the valve. As will readily be appreciated, various forms of sealing fluid having the required characteristics are available, and may be employed in accordance with the present invention.

Figure 2:
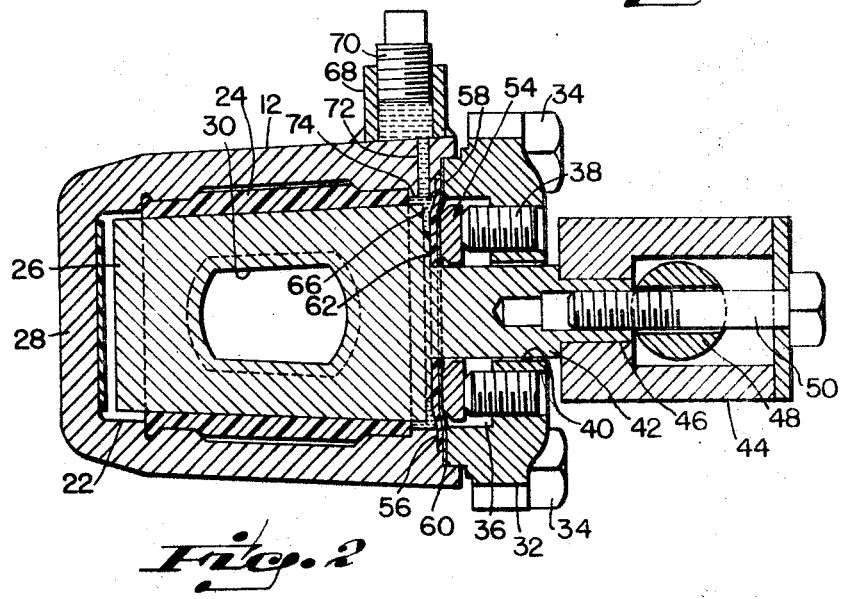
FIG. 2 is a cross-section taken on line 2—2 of FIG. 1.

FIG. 2 indicates introduction of the sealing fluid to the region of the diaphragm by means of a reservoir 68 applied to the valve body, and having a screw plug 70 for forcing the fluid through a passageway 72 and into the annular pocket 64 surrounding the diaphragm seat at 62. The reservoir and screw plug 70 may constitute a means for maintaining the sealing fluid under super-atmospheric pressure at all times, as well as a means for replacement of any sealing fluid which might be depleted or lost under abnormal conditions to which the valve might be exposed.

It should here be noted that the pocket containing the sealing fluid extends to and abuts the larger annular end of the tapered liner, as shown at 74 (see FIG. 3), so as to seal off any fluid that may escape from the valve by leakage between the liner 24 and that portion of the valve body which supports the liner. Otherwise stated, and with reference to FIG. 3, the sealing fluid 66 will seal off leakage which may pass the liner 24 not only where the plug seats against the liner at 76, but more importantly, in the zone 78 where the liner is supported by the valve body. The series of X-marks upon FIG. 3 indicates a path of leakage from the valve inlet port to and behind the liner, which may become a serious leakage zone in the event that the liner shrinks away from the valve body at 78 due to a reduction of temperature within or about the valve. Shrinkage of the plastic liner is of course much greter than that of the valve body material, which usually is metal.

The foregoing explains the problem, and the solutions thereto, of external leakage that may occur along the stem of the valve plug. Another problem is that of internal leakage, where upon closing of the valve a leakage may occur from the upstream side of the valve to the downstream side thereof, through a zone behind the liner or between the liner and the valve body, in the event of liner shrinkage due to a lowering of temperature. The solution to the internal leakage problem involves filling with a highly viscous sealing fluid the spaces or low pressure sealing areas which occur between the liner and the valve body upon shrinkage of the liner.

Figure 5:
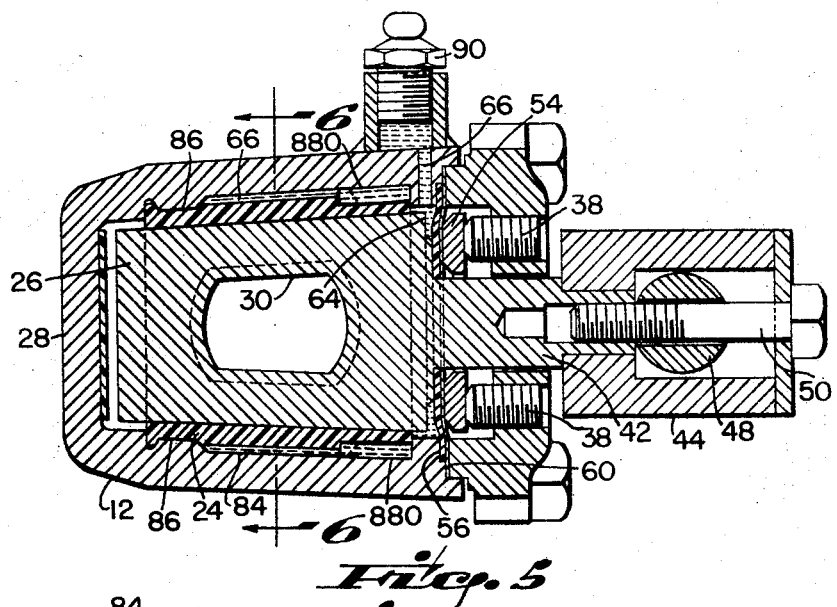
FIG. 5 is a cross-section taken on line 5—5 of FIG. 4.
Figure 6:
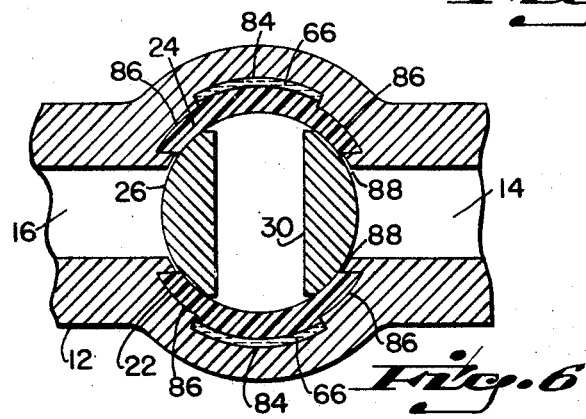
FIG. 6 is a cross-section taken on line 6—6 of FIG. 5.

Internal leakage due to liner shrinkage may be overcome by the means of FIGS. 4, 5 and 6, wherein according to FIG. 4, the viscous sealing fluid of annular pocket 64 is channeled by means of one or more longitudinal passageways 80, to an annular groove 82 formed in the outer surface of the liner near the reduced-diameter end of the liner. The sealing fluid compacted into annular groove 82 effects a seal between the liner and areas of the valve body which support it. Should the liner shrink away from the liner-supporting areas of the body, the viscous sealing fluid will be present there to seal off any leakage tending to occur between the liner and the valve body.

It should be pointed out that he liner 24 when originally inserted into the valve body chamber 22 (FIG. 6) is secured therein by the application of internal pressure which expands the liner against the chamber wall. The chamber wall, rather than being smooth, is provided with depressions such as are indicated at 84, 84 of FIG. 6 into which the liner material may flow under high pressure to key the liner to the valve body. The depressions 84 form low-compression areas, and these are flanked by high-compression areas 86, 86, 86, 86, adjacent to the inlet and outlet ports 14 and 16, to achieve highly effective seating of the plug within the liner.

The low compression areas 84, 84, wherein the liner material is not heavily compacted against the valve body in the fully assembled condition of the valve, is vulnerable to pulling away from the valve body according to FIG. 6 when the liner shrinks upon cooling, thereby permitting entry of viscous sealing fluid 66 from the passageways 80 and 82, between the liner and the valve body. This sealing fluid, being more viscous than the fluid under pressure in inlet port 14, forms a barrier against leakage of fluid from the inlet port at 88, 88, into the adjacent high-compression areas 86, 86, and against the high-viscosity fluid at 66, 66, which effectively opposes continuation of the leakage toward outlet port 16. By this means, internal leakage in the valve is effectively overcome whenever the liner tends to shrink away from the valve body at the locations 88, 86, and 84. Shrinkage of the liner tends to reduce the diameter of the liner, and for this reason leakage is not likely to occur between the liner and the plug when the valve is closed; and moreover, the sealant there interposed tends to force the liner against the plug, enhancing the seal.

Figure 7:
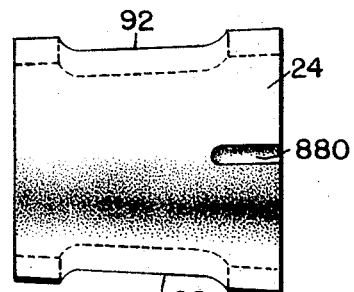
FIG. 7 is a side elevational view of a plastic liner which may be employed in the structures of FIGS. 4, 5 and 6.

FIG. 5 illustrates the use of a high-pressure ball-valved grease fitting 90, through which the sealing fluid may be introduced into the valve between the liner and the valve body both circumferentially of the liner, and against the diaphragm 56, to preclude both internal and external leakage. In this instance the liner 24 may be formed according to FIG. 7, wherein the longitudinal passageways 880 at opposite diameters of the liner are foreshortened to feed sealing fluid to the low-compression areas 84, 84, without carrying any of the sealing fluid to the reduced-diameter end of the liner as in FIG. 4. That is, the liner of FIG. 7 does not necessarily include an annular groove such as 82 of FIG. 4, although such a groove may be provided in the FIG. 7 liner if desired. When no annular groove is provided, the sealant or sealing fluid is depended upon to overcome internal leakage according to FIGS. 5 adn 6, which may suffice since leakage of fluid into the space between the closed end 28 of the valve body and the adjacent end of the plug, poses no serious leakage problem. In FIG. 7, the cut-outs indicated by the numerals 92, are the ports in the liner which register with the inlet and outlet ports of the valve body.

Figure 9:
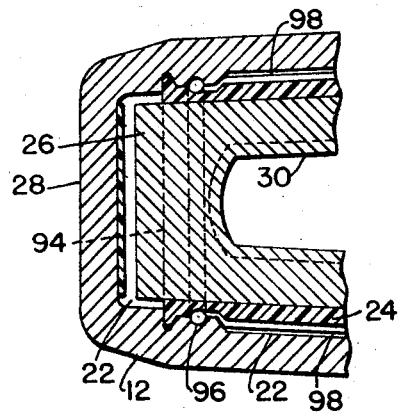
FIG. 9 is a fragmentary cross-section showing a modification of the FIG. 5 structure.
Figure 8:
FIG. 8 is a side elevational view, partly in cross-section, illustrating the liner of FIG. 7 slightly modified.

In the modification illustrated by FIGS. 8 and 9, the liner 24 is shown provided with shallow longitudinal passageways 80, 80, as in FIG. 4, communicating with a shallow annular groove 94 near the reduced-diameter end of the liner. Shallow annular groove 94 is adapted to register with a shallow annular groove 96 provided in the chamber 22 of the valve body, so that sealant may be conveyor by passageways 80, 80 to the registering grooves 94 and 96, to prevent internal leakage of fluid controlled by the valve. Chamber 22 may be provided also with longitudinal shallow passageways or grooves 98 located so as to register always with the longitudinal shallow passageways 80 of the liner, to convey sealant into the low-compression areas of chamber 22 previously mentioned. This arrangement avoids weakening the liner by forming deep passageways and grooves in the outer surface of the liner, and assures the desired sealant feed irrespective of the nature of any distortion of the liner resulting from shrinkage.

By providing fittings such as 90 of FIG. 5, or 70 of FIG. 2, or equivalent fittings, the supply of sealant may be replenished whenever necessary, and such fittings make possible also the maintenance of pressure upon the sealant at all times in aid of the sealing function. If under certain conditions the fittings are considered unnecessary, the areas of the valve to be sealed may be packed with sealant during assembly of the valve, and the sealant because of its high viscosity factor will effectively bar movement of fluid controlled by the valve, along the paths of possible leakage hereinbefore referred to.

Figure 10:
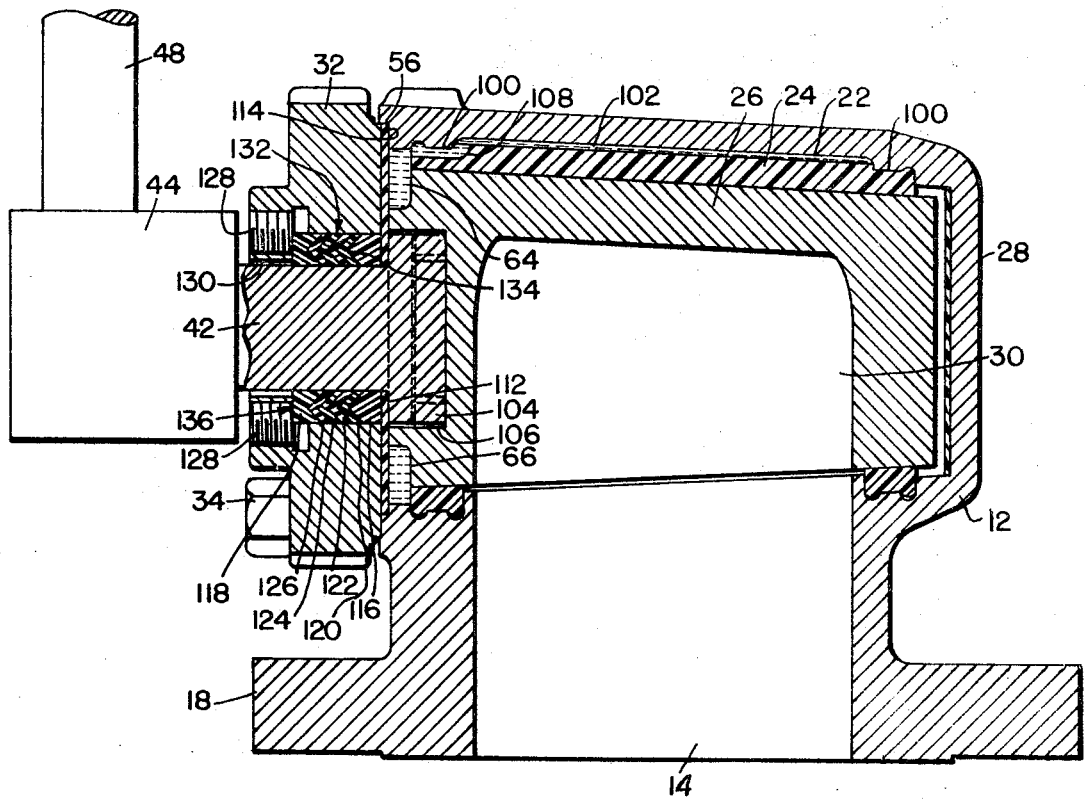
FIG. 10 is a cross-sectional view similar to FIG. 1, showing a modified form of stem sealing means.

FIG. 10 illustrates a plug valve of a somewhat different type than is shown in the preceding drawing views, equipped with the sealing means of the present invention. In the FIG. 10 disclosure, the liner 24 of Teflon or the like may be fixed within the chamber 22 by forceful expansion as hereinbefore explained, with the formation of high-compression and low-compression areas indicated, respectively, at 100 and 102. The plug 26 is rotatable within liner 24 to open and close the valve as usual. The leakage problem in this valve is the same as that present in the valves hereinbefore described, and may be overcome in substantially the same manner with the use of a heavy grease or high-viscosity sealant or sealing fluid of the character mentioned.

In the valve of FIG. 10, the actuating stem 42 is a part separate from plug 26, and may be provided with a head 104 which is approximately square or of other angular formation, fitted loosely within a socket 106 formed in the larger end of plug 26. The socket may be shaped complementarily to the shape of stem head 104, and may loosely accommodate the head so as to permit bodily offsetting of the plug relative to the axis of the stem in the event of dissipation or vaporization of the liner by extreme heat, chemicals, or other damaging elements reaching the liner. The liner, however, is subject also to considerable shrinkage as in the valves heretofore described, particularly when exposed to low temperatures, thereby rendering the valve susceptible to internal and external leakage of the fluid controlled by the valve.

In accordance with the present invention, the highly viscous sealant may be either packed or injected into the low-compression region 102, using any of the means depicted by FIGS. 4 through 9. As disclosed in FIG. 10 by way of example, the liner may be provided with a short passageway 108 similar to the passageway 880 of FIG. 7, for directing sealant from the pocket 64 to the region of low-compression 102. As in FIGS. 1 through 4, the pocket 64 of FIG. 10 contains a quantity of sealant which impinges against diaphragm 56 to bar leakage of valve-controlled fluid to and along the actuating stem 42. Said pocket 64 may be supplied with sealant through fittings such as FIGS. 2 and 5 depict at 70 and 90, or in the alternative, the pocket and the low-compression region 102 may be packed with sealant incident to initial assembly of the valve.

In the event that the liner of FIG. 10 is subject to shrinkage that causes the liner to pull away from the valve body, the highly viscous sealant will act to strongly oppose leakage of valve-controlled fluid past the stem and behind the liner at locations such as 102, substantially as previously described herein.

The actuating stem 42 of FIG. 10 may include a shoulder 112 to support the inner marginal portion of diaphragm 56, while the outer marginal portion thereof is securely clamped at 114 between the cover member 32 and the body of the valve. Surrounding the stem is an inner pressure ring 116 and an outer pressure ring 118, between which may be interposed a plurality of flexible packing rings 120, 122, 124 and 126 which also surround the stem. Said rings 120, 122, 124 and 126 may be chevron-shaped in transverse section, and are stacked in succession one within another as shown, so as to distend radially outwardly and inwardly when compressed between the inflexible rings 116 and 118 which preferably are of a hard material such as metal.

The outer inflexible ring 118 may be forced toward the innermost inflexible ring 118 by means of several adjusting screws 128 threadedly mounted in drilled and tapped holes 130 provided in cover member 32, to compress the intermediate flexible packing rings for sealing off the space between stem 42 and the bore 132 of cover member 32. The screws 128 bear against a planar face 136 of outer ring 118, and where said ring contacts the chevron-shaped packing ring 126, ring 118 may be annularly grooved to accommodate the ridge or gable of the chevron-shaped packing ring 126.

The inner inflexible ring 116 may have a planar face abutting the flexible diaphragm 56, and may compress the diaphragm against stem shoulder 112 to effect a seal therewith. The face of ring 116 opposite to the planar face thereof may be wedge-shaped as at 134, to interfit with the adjacent annular valley of the abutting chevron-shaped packing ring 120, thereby to enforce radial spreading and sealing of ring 120 against the actuating stem and the inner face of bore 132.

Constructed as above described, the means for sealing the actuating stem and the diaphragm against loss of sealant and valve-controlled fluid is highly effective, so that a valve incorporating such means may perform extensive trouble-free service under severe adverse conditions of fluctuating temperature, corrosion attack, and other destructive influences which would soon disable valves as ordinarily constructed. If the valve is to require protection against exposure to fire or intense heat, the chevron packings are possibly also the diaphragm 56 may be formed of asbestos or a composition highly resistant to destruction by such elements.

In conclusion, it should be pointed out that the present valve structure may not properly be classed as a so-called "lubricated valve," in which the plug member is lubricated to facilitate rotation or to seal against fluid leakage about or along the plug. The plug of the valve herein disclosed is not materially lubricated by the sealant, nor is the seat for the plug supplied with any lubricant. This distinguishes the present valve from those classed as lubricated valves.

What is claimed is:

1. A rotary plug type fluid-control valve, comprising in combination a body having an inlet port, an outlet port, and an intermediate substantially cylindrical-walled chamber in which a valving plug is rotatable to open and close said ports; an elongate substantially cylindrical valving plug having opposite ends, and a through port registrable with said body ports upon partial rotation of the plug; a rotational actuating stem projecting axially from one end of the plug for imparting rotation to said plug; an elongate substantially cylindrical plastic liner having opposite ends, an axial bore in which the plug is seated, and an apertured substantially cylindrical outer surface supported within the body chamber against rotational and longitudinal shifting movement of the liner with the apertures thereof in registry with the inlet and outlet ports of the valve body; said plastic liner being subject to a degree of radial shrinkage greater than that of the valve body when exposed to lowered temperature, so that the liner in shrinking tends to pull away from the supportive wall of the body chamber and thereby produce a leakage zone between said supportive wall and the adjacent outer surface of the plastic liner, of fluid contained within the valve body at the inlet port; and a sealant fluid highly resistive to movement interposed in the leakage zone between the liner and the supportive wall of the body chamber to form a barrier opposing movement of valve-controlled fluid through said leakage zone, and means for supplying under pressure a continuous supply of sealant fluid to said leakage zone to force the liner against the plug.

2. The valve as specified by claim 1, wherein the sealant is characterized by a high degree of viscosity greater than that of the valve-controlled fluid.

3. The valve as specified by claim 1, wherein the plastic liner is formed of a material of the class of polytetrafluoroethylene.

4. The valve as specified by claim 1, wherein the combination includes: a transversely bored cover member surrounding the plug actuating stem, and means for clamping the cover member to the valve body about the intermediate chamber thereof; a flexible fluid-impervious diaphragm having a substantially central opening therein accommodating the actuating stem, said diaphragm including an outer marginal portion clamped between the cover member and the valve body in sealing relationship thereto; an annular seat adjacent to the stem end of the valving plug for supporting the diaphragm marginally of said diaphragm opening, the stem end of the plug being annularly recessed about said seat to provide an annular pocket for sealant between one face of the diaphragm and the stem end of the plug, said pocket being in fluid communication with the leakage zone between the liner and the supportive wall of the body chamber aforesaid; and means for adjustably pressure-sealing the margin of the diaphragm opening against said annular seat of the valving plug.

5. The valve as specified by claim 4, wherein the liner is formed of a material of the class of polytetrafluoroethylene.

6. The valve as specified by claim 4, wherein the sealant is characterized by a high degree of viscosity greater than that of the valve-controlled fluid.

7. The valve as specified by claim 4, wherein the combination includes means for maintaining under superatmospheric pressure the sealant within the pocket aforesaid.

8. The valve as specified by claim 3, wherein the means last mentioned includes at least one chevron-shaped packing ring surrounding the actuating stem and annularly sealing the bore of the cover member, said packing ring being subjected to pressure imposed by said means.

9. The valve as specified by claim 8, wherein said packing ring is formed of asbestos or asbestos-bearing material substantially indestructible by intense heat.

10. The valve as specified by claim 9, wherein the actuating stem is a part separate from the plug; and connecting means subject to offsetting of the stem axis from the plug axis is provided for imparting rotation of the stem to said plug.

11. The valve as specified by claim 10, wherein the combination includes means for placing the sealant under superatmospheric pressure within the pocket and the leakage zone aforesaid.

12. A rotary plug type fluid-control valve comprising in combination, a body having an inlet port, an outlet port, and an intermediate substantially cylindrical-walled chamber in which a valving plug is rotatable to open and close said ports; and elongate substantially cylindrical valving plug having opposite ends, and a through port registrable with said body ports upon partial rotation of the plug; a rotational actuating stem projecting axially from one end of the plug for imparting rotation of the stem of said plug; an elongate substantially cylindrical plastic liner having opposite ends, an axial bore in which the plug is seated, and an apertured substantially cylindrical outer surface supported within the body chamber against rotational and longitudinal shifting movement of the liner, with the apertures thereof in registry with the inlet and outlet ports of the valve body; a transversely bored cover member surrounding the plug actuating stem, and means for clamping the cover member to the valve body a about the intermediate chamber thereof; a flexible fluid-impervious diaphragm having a substantially central opening therein accommodating the actuating stem, said diaphragm including an outer marginal portion clamped between the cover member and the valve body in sealing relationship thereto; an annular seat adjacent to the stem end of the valving plug for supporting the diaphragm marginally of said diaphragm opening, the stem end of the plug being annularly recessed about said seat to provide an annular pocket for sealant between one face of the diaphragm and the stem end of the plug; means for adjustably pressure-sealing the margin of the diaphragm opening against said annular seat of the valving plug; and a sealant fluid highly resistant to movement, contained within said pocket and impinging against one end of the liner and against the diaphragm in the region of said annular seat, to resist flow of valve-controlled fluid past said annular seat and along the actuating stem of the plug and means for supplying to said pocket under pressure a continuous supply of sealant fluid.

13. The valve as specified by claim 12, wherein the sealant fluid is characterized by a high degree of viscosity.

14. The valve as specified by claim 12, wherein the sealant fluid is characterized by a high degree of viscosity greater than that of the valve-controlled fluid.

15. The valve as specified by claim 12, wherein the pressure-sealing means includes at least one chevron-shaped packing ring surrounding the actuating stem and annularly sealing the bore of the cover member, said packing ring being subjected to pressure imposed by said means.

16. The valve as specified by claim 15, wherein said packing ring is formed of asbestos or asbestos-bearing material resistive of intense heat.

17. The valve as specified by claim 16, wherein the actuating stem is a part separate from the plug; and the combination includes connecting means subject to off-setting of the stem axis from the plug axis, for imparting rotation of the stem to said plug.

18. The valve as specified by claim 17, wherein the liner is formed of a material of the class of polytetrafluoroethylene.

19. The valve as specified by claim 15, wherein the liner is formed of a material of the class of Teflon.

References Cited

UNITED STATES PATENTS

| | | | |
|---|---|---|---|
| 1,909,303 | 5/1933 | Mueller | 251—175 |
| 3,061,267 | 10/1962 | Hamer | 137—246.22 X |
| 3,081,974 | 3/1963 | Traut | 251—172 |
| 3,132,838 | 5/1964 | Smith | 251—214 |
| 3,263,697 | 8/1966 | Reed | 251—175 X |
| 3,284,089 | 11/1966 | Wrenshall | 251—214 X |
| 4,415,488 | 12/1968 | Priese | 137—246.23 X |

CLARENCE R. GORDON, Primary Examiner

U.S. Cl. X.R.

137—246.22; 251—214, 309, 317